United States Patent [19]

Mizuno et al.

[11] Patent Number: 5,372,615
[45] Date of Patent: Dec. 13, 1994

[54] BIN CAP FOR MUSHROOM CULTURE

[75] Inventors: Masayuki Mizuno; Katsuji Yamanaka; Satosi Inatomi; Kenji Namba, all of Nagano, Japan

[73] Assignee: Hokuto Corporation, Naganoken, Japan

[21] Appl. No.: 138,261

[22] Filed: Oct. 20, 1993

[51] Int. Cl.⁵ .................. A01G 1/04; C12M 1/24; C12M 1/12
[52] U.S. Cl. ....................... 47/1.1; 435/296; 435/311
[58] Field of Search ............ 47/1.1; 435/297, 296, 435/298, 311

[56] References Cited

FOREIGN PATENT DOCUMENTS 62-91945  6/1987  Japan .
3-27402   6/1991  Japan .
985763    3/1965  United Kingdom .
2048037A  12/1980 United Kingdom .

OTHER PUBLICATIONS

Edwards, R. L. 1978. In The Biology and Culivation of Edible Mushrooms, Chang et al., eds. pp. 321–327.

*Primary Examiner*—David T. Fox
*Assistant Examiner*—Erich E. Veitenheimer

[57] ABSTRACT

A bin cap for mushroom culture bins for cultivating mushrooms such as shiitake (*Lentinus edodes* (Berk.) Sing.), *Lyophyllum shimeji* (Kawam.) Hongo, and the like which includes a housing part Z including a space S internally for ventilation and having windows 2w for ventilation with a broader open area than the open area of bin mouth Bo, breathable filter part 3 blocking window 2w, and fitting part 4 being installed at the under surface 2d of housing part 2 and being attached to or detached from bin mouth Bo. Thereby, the ventilation is secured and the exhaust of carbon dioxide is promoted.

3 Claims, 3 Drawing Sheets

BIN CAP FOR MUSHROOM CULTURE

FIELD OF THE INVENTION

The present invention relates to a bin cap for a culture of mushrooms that is suitably used in culture bins for cultivating mushrooms such as shiitake (*Lentinus edodes* (Berk.) Sing.), *Lyophyllum shimeji* (Kawam.) Hongo, and the like.

DESCRIPTION OF THE RELEVANT ART

Vegetation of mushrooms in a bin culture (mushroom bed cultivation) generally comprises nutritive vegetation and reproductive vegetation. At the cultivation step of the nutritive vegetation growth, holes for inoculation are provided on mushrooms culture medium filled in culture bins; mushroom spawn is inoculated in these holes and, in a culture room, hyphae are allowed to spread in the bins that are capped for preventing miscellaneous fungi from entering. On the other hand, at the reproductive vegetation, the culture bins that have been removed of the caps or the mushroom culture medium only is transferred into cultivating containers to be grown in a cultivating room. Since carbon dioxide is generated in a large volume in the cultivation process of the hyphae, poor ventilation in the culture bins may obstruct breathing of the hyphae and further obstruct their efficient reproduction, resulting in a longer cultivation period and deterioration of the mushroom quality.

In view of this, Japanese Utility Model Publication No. 27402/'91 (Hei-3) has proposed a cap for culture bins that has a zigzag air flow path in the cap body whereby the internal part of the culture bins communicates with the outside when the cap is fitted to the bins; Japanese Utility Model Provisional Publication No. 91945/'87 (Sho-62) disclosed a cap for culture bins that has an open part and ventilating part in the cap body, both parts being covered with permeable material under which material absorbents for carbon dioxide are accommodated.

However, these conventional caps have merely improved general caps that fit to the mouth part of culture bins and are disadvantageous in the following respects.

At first, the opening area provided in the cap is nearly the same as that of the bin mouth or less and insufficient for securing enough ventilation and ultimately, problems associated with poor ventilation are not overcome. Also, because of insufficient evaporation of water from the culture bins, the water content of the culture medium of mushroom cannot be maintained at a proper level.

Secondly, carbon dioxide is heavier than air; therefore, securing ventilation in the upper surface of the cap does not provide efficient and effective ventilation.

SUMMARY OF THE INVENTION

An object of the present invention is to provide a cap for mushroom culture bins that makes it possible to afford enough ventilation by securing an adequate quantity of airflow to promote the breathing of hyphae, making the cultivation period shorter, improving the mushroom quality, increasing the harvest, accelerating vaporization and dissipation of water, and maintaining the mushroom culture medium in the culture bins with proper water content.

Another object of the present invention is to provide a cap for mushroom culture bins, that secures a downward air passing route; whereby carbon dioxide, heavier than air, is exhausted efficiently and effectively.

For attaining these objects, cap 1 according to the present invention comprises: housing part 2 that has space S for ventilation and window 2w for ventilation having broader open area than the open area of bin mouth Bo; breathable filter part 3 that blocks window 2w; and fitting part 4, installed at the under surface 2d of housing part 2, which is attachable to or detachable from bin mouth Bo. Housing part 2, flat and formed broader than bin mouth Bo, has windows 2w for ventilation at a lower surface 2d and upper surface 2u. The outside diameter of housing part 2 is preferably selected to be 1.2 or more times larger than that of bin mouth Bo. Filter part 3 may be formed with paper.

In this arrangement, cap 1 is attached to or detached from mouth Bo of a culture bin by means of fitting part 4; the opening of bin mouth Bo communicates with space S for ventilation when cap 1 is attached. Therefore, in case carbon dioxide content increases in the culture bin when hyphae are cultivated, the carbon dioxide goes into ventilation space S of housing part 2 through bin mouth Bo. Since housing part 2 has ventilation window 2w which has an open area larger than bin mouth Bo, the carbon dioxide in ventilation space S is exhausted outside through breathable filter part 3 that blocks ventilation windows 2w while simultaneously oxygen is supplied into the culture bin. Thereby enough ventilation is kept in the culture bin.

Air flow in the vertical direction through upper surface 2u and lower surface 2d is secured in particular by the arrangement according to the present invention that comprises housing part 2, being flat and broader than bin mouth Bo, and ventilation windows 2w at lower surface 2d and upper surface 2u, whereby exhaust of carbon dioxide, heavier than air, is promoted by being discharged downward through lower surface 2d.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
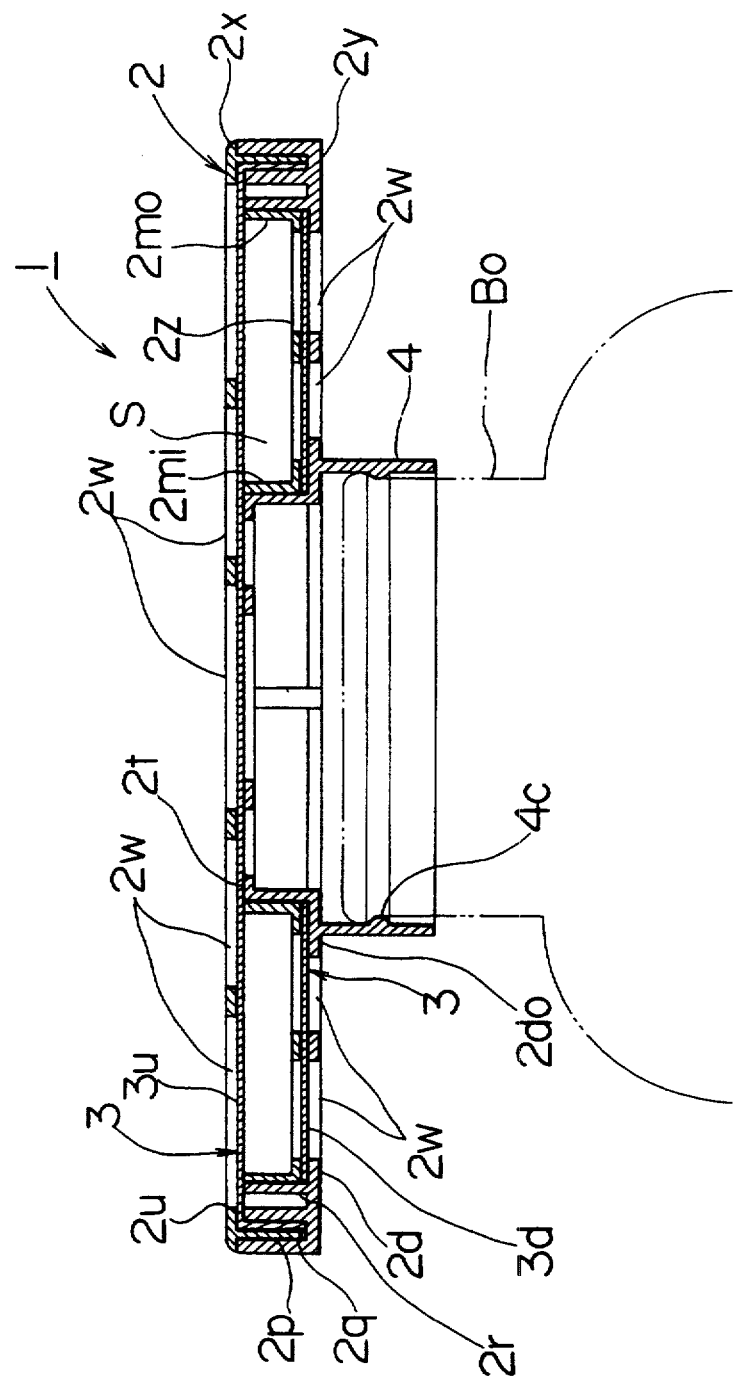
FIG. 1 is a vertical cross sectional view of a bin cap according to the present invention.
Figure 2:
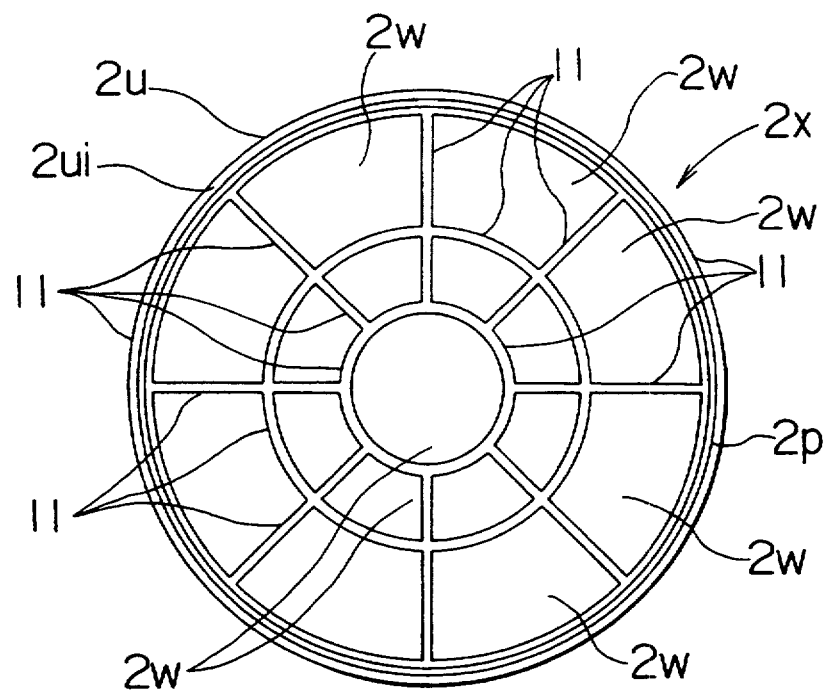
FIG. 2 is a bottom view of an upper housing member which is a component of a bin cap according to the present invention.
Figure 3:
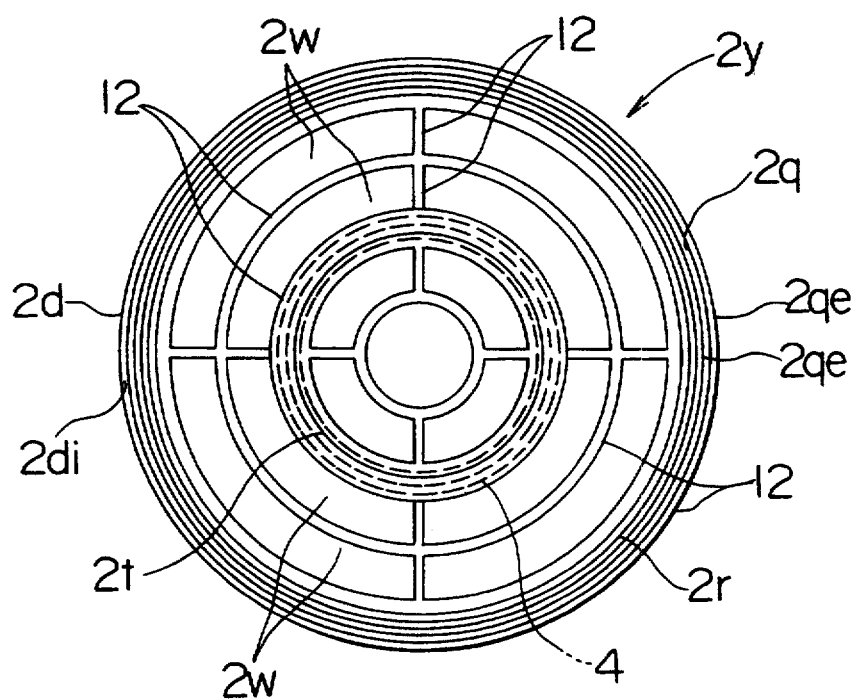
FIG. 3 is a plan view of a lower housing member which is a component of a bin cap according to the present invention.

Now, the present invention is explained in detail by reference to the preferred embodiments in the drawings.

At first, arrangement of bin cap 1 of the present invention for mushroom culture bins is explained referring to FIGS. 1 through 4.

Figure 4:
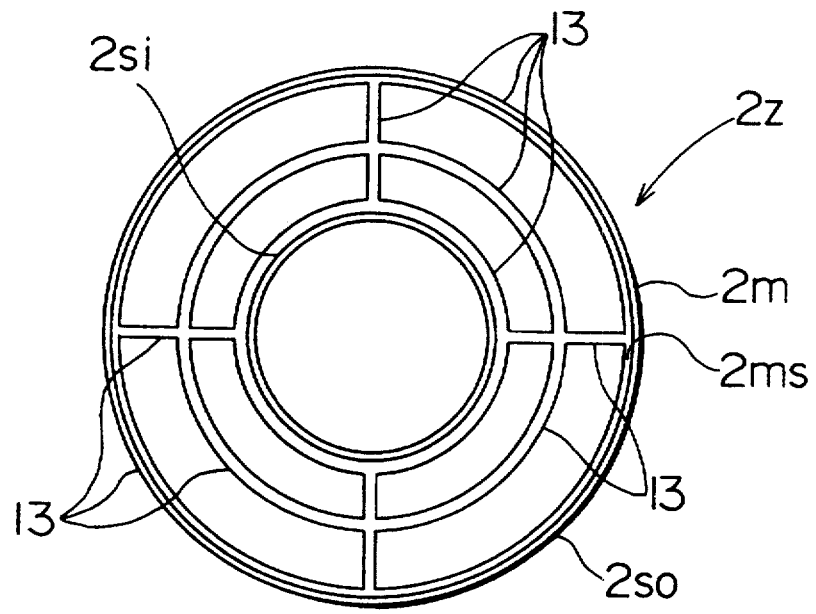
FIG. 4 is a plan view of a supporting member for the lower filter which member is a component of a cap according to the present invention.

A bin cap 1 For mushroom culture bins comprises, roughly speaking, housing part 2, filter part 3, and fitting part 4 as shown in FIG. 1. Housing part 2 comprises three separate members: upper housing member 2x shown in FIG. 2, lower housing member 2y shown in FIG. 3, and supporting member 2z, as shown in FIG. 4, for the lower filter and the respective members are formed in one body. While various synthetic resins may be used as the molding material of respective members, it is desirable to use polypropylene containing silicone in an amount of 0.1 through 2 percent by weight that improves the elasticity, heat-resistance, of molded members with uniformly dispersed fine silicone particles throughout the synthetic resin. In addition, the construction of this type of container is difficult to be soiled.

Upper housing member 2x comprises disclike upper surface part 2u having a plurality of frame parts 11 and a ring shape (cylindrical) convex part 2p that is molded in integration near the outer periphery of the inner surface 2ui of upper surface part 2u; the convex part 2p, is formed with a rising plate portion of a predetermined height, which rises at a right angle from the inner surface 2ui. In this way, the space divided by frame parts 11 inside the surface of upper housing member 2x forms ventilation window 2w.

Lower housing member 2y has disclike lower surface part 2d comprising a plurality of frame parts 12; lower surface part 2d has a ring shape(cylindrical) concave part 2q formed in integration near the outer periphery of the inner surface 2di of lower surface part 2d. The concave part 2q is formed with a pair of rising plates 2qe and 2qe of a predetermined height facing each other and rising at right angle from inner surface 2di. Rising plate 2qe forms the outer surface of housing part 2. A first supporting part 2r along the concave part 2q, is formed in one body protruding at the same height as concave part 2q at a position separated by a predetermined distance further inside than concave part 2q of the inner surface 2di. A second circular supporting part 2t is provided coaxially to the central side of inner surface 2di. Second supporting part 2t is formed inflated in the same direction as the first supporting part 2r so as to be of the same height as the first supporting part 2r. The space divided by frame parts 12 in the surface of lower housing member 2y forms ventilation window 2w.

Cylindrical fitting part 4 is formed in integration projected perpendicularly from outer surface 2do of lower housing member 2y. The inside diameter of fitting part 4 is selected so as to be able to be attached to the periphery of bin mouth Bo of culture bin Bas shown in FIG. 1. Protrusion part 4c is provided in integration with fitting part 4 on its internal surface to be engaged in the thick wall part near the upper edge of bin mouth Bo to prevent coming-off.

Lower filter supporting member 2z has doughnut-like support surface part 2m having a plurality of frame parts 13 and ring shape (cylindrical) side surface parts 2so and 2si are formed in integration near outer and inner peripheries respectively of one surface 2ms of supporting surface part 2m. Respective side surface parts 2so and 2si are formed with rising plates of a predetermined height standing at right angle from one surface 2ms of the supporting surface part 2m.

Filter part 3 is prepared from a sheet of paper. In the present embodiment, round upper filter 3u is used for upper housing member 2x together with doughnut-like lower filter 3d for lower filter sheet 3d. As for filter sheets 3u and 3d, a single kind of paper or synthetic paper may be used while a synthetic resin sheet or other materials may be employed.

Next by referring to FIG. 1, how to assemble bin cap 1 is explained together with positional relationship for respective parts and their sizes.

First, lower filter sheet 3d is accommodated between first supporting part 2r and second supporting part 2t and supported by inserting supporting member 2z. In this manner, entire ventilation windows 2w formed at lower side surface 2d are blocked by under filter sheet 3d. The tip ends of side surface parts 2so and 2si of lower supporting member 2z, when fitted, are nearly as high as the tip ends of first supporting part 2r and second supporting part 2t.

Next, upper filter sheet 3u is inserted between lower housing member 2y and upper housing member 2x; the latter two are then pushed against each other, In this way, convex part 2p is inserted into concave part 2q and both are fitted together, whereby a part of the outer periphery of upper filter sheet 3u is pushed into the internal part of concave part 2q and fixed by convex part 2p and concave part 2q. Also upper filter sheet 3u is supported by first supporting part 2r and second supporting part 2t of lower housing member 2y. Thus, all the ventilation windows 2w formed in upper surface part 2u of upper housing member 2x are blocked by filter sheet 3u while being fixed to upper housing member 2x.

As explained hereinabove, assembly of bin cap 1 for mushroom culture bins of the present invention is completed. Now, bin cap 1 has space S internally for ventilation and is shut tight except the opening at fitting part 4. The outside diameter of housing part 2 is selected to be 1.2 or more times larger than that of bin mouth Bo. Accordingly, the total open area of ventilation windows 2w is broader than the open area of bin mouth Bo.

Figure 5:
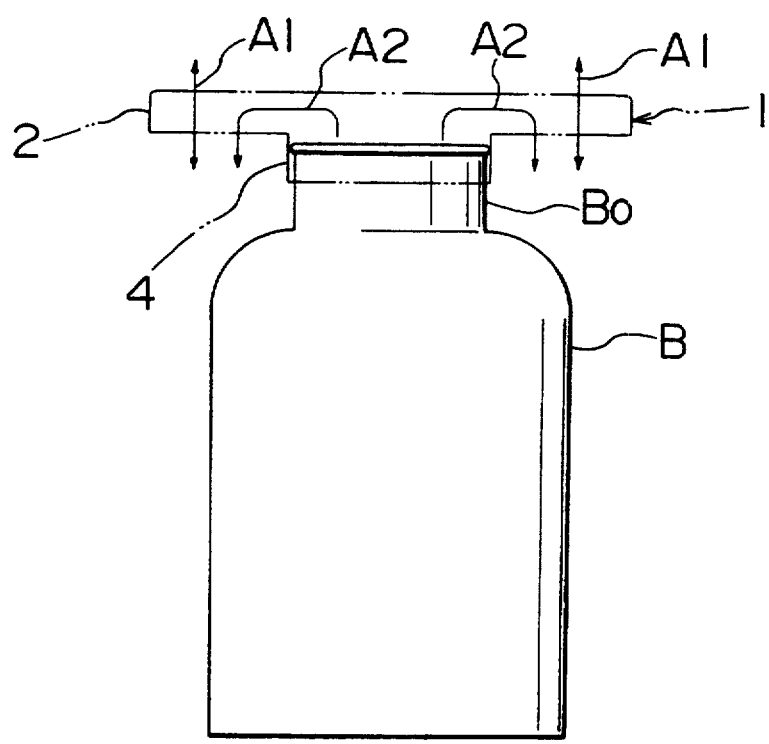
FIG. 5 is a schematic view explaining how a bin cap according to the present invention works.

Next, the function of the cap 1 for mushroom culture bins according to the present invention is explained by referring to FIG. 5.

A bin cap 1 is attached to or detached from mouth Bo of a culture bin by means of fitting part 4. When cap 1 is attached, the opening of bin mouth Do communicates with the inside of housing part 2 provided at the upper end of fitting part 4, that is, ventilation space S.

Therefore, in case carbon dioxide content increases in the culture bin when hyphae are cultivated, the carbon dioxide goes into ventilation space S of housing part 2 through bin mouth Bo and breathable filter part 3 blocking ventilation windows 2w, thereby enough ventilation is maintained. Since housing part 2 has ventilation window 2w that has open area larger than 2 bin mouth Bo, carbon dioxide is effectively exhausted from bin mouth Bo and oxygen is effectively supplied into the Culture bin. Especially, as arrow A1 indicates in FIG. 5, ventilation paths in vertical direction through upper surface part 2u and lower surface part 2d respectively secure the passage route for ventilation, carbon dioxide heavier than air is exhausted downward via the route indicated by arrow A2, which promotes effective ventilation.

Shiitake was cultured using bin cap 1 according to the present invention and using conventional cap for comparison; as a result, contrasting data as shown hereunder have been obtained. The conventional cap employed in this case was an ordinary bin cap with an open part on upper surface and the open part being blocked by a breathable paper.

At first, the capped culture bin in which the cultivation was under way was left in a desiccator of a certain volume and the amount Of the discharged carbon dioxide per one hour was determined. The result was:

72.4 ml for the case of the conventional cap, and 91.9 ml (1.25 times the former) for bin cap 1 according to the present invention.

The carbon dioxide concentration in the culture bin was measured at the 40th day of the cultivation; it was 9.6 percent for the conventional cap and 3.2 percent, about ⅓ of the former, for bin cap 1 according to the present invention, showing satisfactory improvement.

At the 90th day of the cultivation, the following four items were compared: (1) Water content in the culture medium for the mushroom culture, (2) Spawn run time until the spreading of hyphae reached to the full bin, (3) Elapsed days until the color turned brown, and (4) Amount of harvest. The results were:

|  | (1) | (2) | (3) | (4) |
|---|---|---|---|---|
| Conventional cap | 78.8% | 25 days | 60 days | 180.4 g |
| Cap 1 according to the present invention | 73.3% | 23 days | 50 days | 216.7 g | showing that bin cap 1 according to the present invention gave better results for all items: namely, shorter spawn run time, better quality and more harvest were brought about.

While a preferred embodiment has been particularly described in details, the present invention is not limited to such an embodiment. For example, the ventilation window may be provided in only one surface, either in upper or lower surface of the housing part. In place of a paper sheet which was used as the filter, block materials such as polyurethane may be filled in ventilation space S as necessary and the housing may be formed like a drum can or cone by extending upward. In addition, various modifications are applicable within the spirit and scope of the present invention including detailed arrangement, shape, size, and materials.

What is claimed is:

1. A bin cap for mushroom culture bins comprising:
a housing defining an interior space for ventilation, an outside diameter of said housing being selected to be 1.2 or more times larger than an outside diameter of a bin mouth, said housing being substantially flat and providing an open area defining a window for ventilation providing a surface being larger than an open area of the bin mouth;
a breathable filter member for blocking the window for ventilation; and
a fitting member operatively connected to said housing for selectively attaching to and detaching from a bin mouth.

2. A bin cap for mushroom culture bins according to claim 1, wherein the windows for ventilation are provided at a lower surface and an upper surface of the housing.

3. A bin cap for mushroom culture bins according to claim 1, wherein the filter is formed of paper for covering the inside of the window for ventilation.

* * * * *